(12) United States Patent
Venkat et al.

(10) Patent No.: US 7,854,000 B2
(45) Date of Patent: Dec. 14, 2010

(54) METHOD AND SYSTEM FOR ADDRESSING ATTACKS ON A COMPUTER CONNECTED TO A NETWORK

(75) Inventors: Balaji Venkat, Tamil Nadu (IN); Srinivas Subramanian, San Jose, CA (US); Venkat Ramani, Tamil Nadu (IN); Shankar Raman, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 1319 days.

(21) Appl. No.: 10/973,188

(22) Filed: Oct. 26, 2004

(65) Prior Publication Data

US 2006/0168649 A1    Jul. 27, 2006

(51) Int. Cl.
G06F 11/00 (2006.01)
G06F 12/14 (2006.01)
G06F 12/16 (2006.01)
G08F 23/00 (2006.01)

(52) U.S. Cl. .................. 726/22; 713/151
(58) Field of Classification Search .......... 726/22
See application file for complete search history.

(56) References Cited

U.S. PATENT DOCUMENTS

| | | | | |
|---|---|---|---|---|
| 6,009,103 | A * | 12/1999 | Woundy | 370/401 |
| 6,256,314 | B1 * | 7/2001 | Rodrig et al. | 370/401 |
| 6,338,089 | B1 * | 1/2002 | Quinlan | 709/227 |
| 6,907,470 | B2 * | 6/2005 | Sawada et al. | 709/244 |
| 7,134,012 | B2 * | 11/2006 | Doyle et al. | 713/151 |
| 2002/0013844 | A1 * | 1/2002 | Garrett et al. | 709/225 |
| 2002/0108059 | A1 * | 8/2002 | Canion et al. | 713/201 |
| 2004/0003285 | A1 * | 1/2004 | Whelan et al. | 713/201 |

OTHER PUBLICATIONS

Peng, Tao, Leckie, Christopher, Ramamohanarao, Kotagiri., "Protection from Distributed Denial of Service Attack Using History—Based IP Filtering," ARC Special Resarch Center for Ultra—Broadband Information Networks, Department of Electrical Engineering and Electronic Engineering, The University of Melbourne, Victoria 3010, Austrailia, Apr. 2000.*

Paxson, Vern., "An Analysis of Using Reflectors for Distributed Denial of Service Attacks," AT&T Center for Internet Research at ICSI International Computer Science Institute, Berkeley, CA. USA Publication date: Jul. 2001.*

(Continued)

*Primary Examiner*—Farid Homayounmehr
*Assistant Examiner*—Dant B Shaifer Harriman
(74) *Attorney, Agent, or Firm*—Baker Botts L.L.P.

(57) ABSTRACT

A method for addressing attacks on a computer connected to a network includes receiving at a router a TCP SYN request to be screened. The method also includes comparing the received TCP SYN request to be screened to at least one stored tuple representative of one or more SYN requests previously received at the router and determining that the received TCP SYN request to be screened matches the stored tuple. In response to determining that the received TCP SYN request to be screened matches the stored tuple, the TCP SYN+ACK response is prevented from being sent by the router in response to the TCP SYN request to be screened.

42 Claims, 5 Drawing Sheets

OTHER PUBLICATIONS

Savage, Stefan, Wetherell, David, Karlin, Anna, Anderson, Tom., "Practical Network Support for IP Traceback," Department of Computer Science and Engineering, University of Washington, Seattle, WA, USA, Sigcomm, 2000, Stockholm, Sweden.*

Vern Paxson, "An Analysis of Using Reflectors for Distributed Denial-of-Service Attacks," *AT&T Center for Internet Research at ICSI International Computer Science Institute,vern@aciri.org; To appear in Computer Communication Review 31*(3); http://citeseer.ist.psu.edu/451074.html, Jul. 2001.

Tao Peng, Christopher Leckie, Kotagiri Ramamohanarao, "*Protection from Distributed Denial of Service Attack Using History-based IP Filtering*", ARC Special Research Center for Ultra-Broadband Information Networks, Department of Electrical and Electronic Engineering; http://citeseer.ist.psu.edu/5555589.html, Oct. 19, 2004.

"*The Most Experience in Network Intrusion Prevention Solutions*", Top Layer, http://www.toplayer.com/content/products/intrusion_detection/attack_mitigator.js p, Oct. 19, 2004.

Avi Freedman, "*ISP Tech Talk, Stopping the Flood*", http://avifreedman.net/bw/mar97.html, Oct. 19, 2004.

Steve Gibson, "*DRDoS Distributed Reflection Denial of Service*", http://grc.com/dos/drdos.htm (23 pages), Feb. 22, 2002.

* cited by examiner

FIG. 7

METHOD AND SYSTEM FOR ADDRESSING ATTACKS ON A COMPUTER CONNECTED TO A NETWORK

TECHNICAL FIELD OF THE INVENTION

This invention relates generally to computer security and more particularly to a method and system for addressing attacks on a computer connected to a network.

BACKGROUND OF THE INVENTION

Computer networks are pervasive in today's society. Although networking computers provides tremendous advantages, attaching a computer to a network makes the attached computer susceptible to a variety of malicious attacks.

One type of malicious attack is a distributed reflection denial of service attack (DRDOS attack). A DRDOS attack can take the shape or form of a debilitating bandwidth multiplicative attack on a victim that effectively shuts down a victim. In essence, a DRDOS attack involves an attacker sending to a router a synchronized (SYN) request apparently requesting the opening of a TCP connection. However, instead of sending a source address corresponding to the IP address of the attacker, the attacker sends a spoofed source address corresponding to the IP address of the target of the attack. In response, the router receiving the SYN message sends a synchronized acknowledge signal (SYN+ACK) to the source address received in the SYN message, which corresponds to the IP address of the target, resulting in the router sending the SYN+ACK response to the target rather than to the attacker. If enough such SYN messages are sent, and they are sent to a plurality of different routers, an enormous number of SYN+ACK messages can be dumped on the target. This is particularly true because of the multiplicative effect of the use of a large number of routers. The result is that the aggregating router closest to the victim can find its bandwidth being hogged by such a SYN+ACK flood, thus not permitting the victim any legitimate traffic.

Conventional approaches at addressing this type of attack have not been entirely successful. One example of such an approach is to filter the traffic at the aggregation router closest to the victim so that all traffic headed from particular ports could be prevented. Another solution is to deploy unicast reverse path forwarding checks, egress filtering, etc. that would block all spoofed traffic coming into a victim's network.

SUMMARY OF THE INVENTION

A method for addressing attacks on a computer connected to a network includes receiving at a router a TCP SYN request to be screened. The method also includes comparing the received TCP SYN request to be screened to at least one stored tuple representative of one or more SYN requests previously received at the router and determining that the received TCP SYN request to be screened matches the stored tuple. In response to determining that the received TCP SYN request to be screened matches the stored tuple, the TCP SYN+ACK response is prevented from being sent by the router in response to the TCP SYN request to be screened.

Embodiments of the invention may provide numerous technical advantages. Some embodiments may benefit from some, none, or all of these advantages. For example, according to one embodiment of the invention attempted attacks on a computer can be addressed while also allowing for the possibility of identifying the source of the attacks. According to one embodiment, the spoofer may be fooled into believing that the victim requires more specified packets to go down, which allows time to activate backtracking and potentially identifying the source of the attack. Further, according to one embodiment the router utilized by the spoofer to originate the attack may be identified.

Other advantages may be readily apparent to one of skill in the art.

BRIEF DESCRIPTION OF THE FIGURES

Reference is now made to the following description taken in conjunction with the accompanying drawings, wherein like reference numbers represent like parts, in which.

DETAILED DESCRIPTION OF THE INVENTION

Embodiments of the invention are best understood by referring to FIGS. 1 through 7 of the drawings, like numerals being used for like and corresponding parts of the various drawings.

Figure 1A:
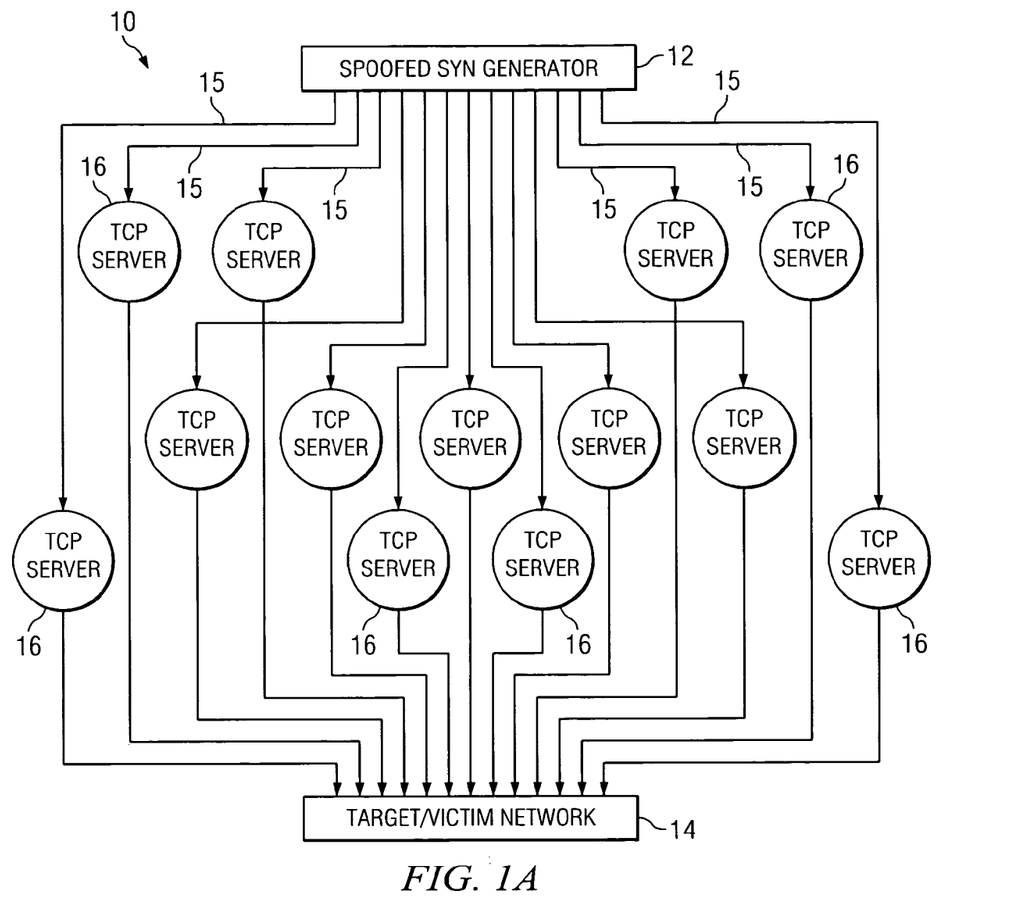
FIG. 1A is a block diagram illustrating a distributed reflection denial of service attack (DRDOS attack)

FIG. 1A is a block diagram illustrating a distributed reflection denial of service attack (DRDOS attack), which may be addressed according to the teachings of the invention. Illustrated in FIG. 1A is a portion of a network 10 that includes an attacker 12 and a target, or victim, 14. In this example, attacker 12 attempts to flood victim 14 with numerous SYN+ACK packets such that victim 14 is unable to receive any legitimate network traffic. In a DRDOS attack this is accomplished, as described above, by attacker 12 sending synchronized packets (SYN packets) as indicated by reference numeral 15 to numerous TCP servers, or routers, 16. Unlike a typical SYN packet, however, the SYN packets sent by attacker 12 spoof the source address contained in the SYN packet to be the IP address of victim 14. Thus when each TCP server 16 responds to the SYN packet 15 with a SYN+ACK packet, the response SYN+ACK packet is sent to the victim. This is because SYN+ACK packets are conventionally sent to the IP address received, which is indicated in the SYN packet as the source address of the SYN packet. Thus, as illustrated, by the attacker 12 sending such spoofed SYN packets to numerous TCP servers, a victim may be flooded with SYN+ACK packets from numerous TCP servers, effectively shutting down legitimate traffic to the victim 14.

Figure 1B:
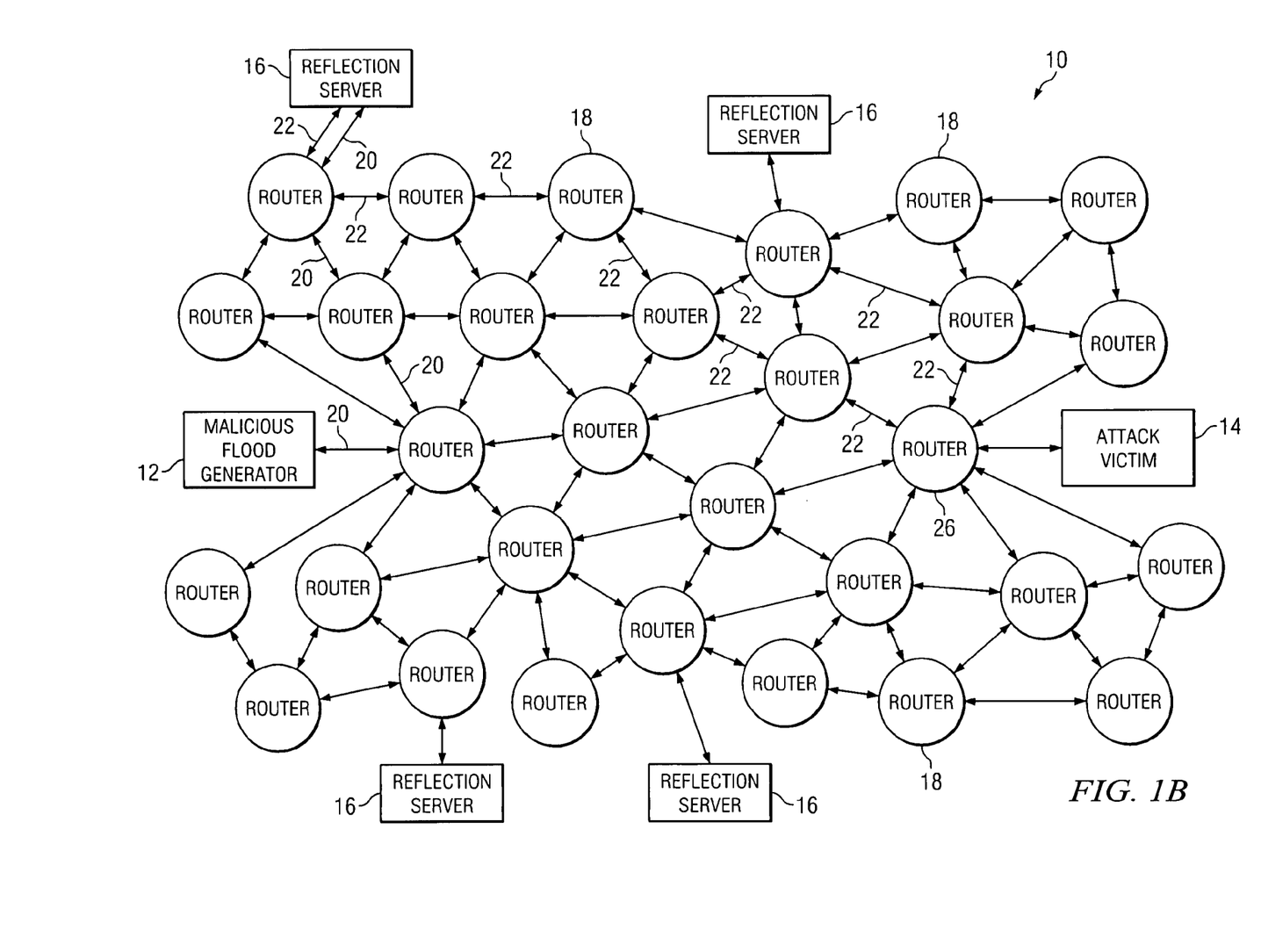
FIG. 1B is a block diagram illustrating additional detail of the attack of FIG. 1A.

FIG. 1B further illustrates this type of attack and the associated advantages of utilizing TCP servers 16 as an intermediary to generate SYN+ACK packets directed toward victim 14. FIG. 1B illustrates the same network 10 as is shown in FIG. 1A; however, intermediate routers 18 are also illustrated. As shown, a SYN packet is generated by attacker 12 and transmitted over paths 20 through a plurality of routers to reach a reflection server 16, which is another name for a TCP server or router used to generate the spoofed SYN+ACK packet. In turn, the reflection server 16 transmits the SYN+ACK packet through a plurality of routers 18 over paths 22 to reach victim 14. As illustrated in this example, all such SYN+ACK attack packets flow through an aggregation router 26 from which a victim receives all of its network traffic. Because of the inclusion of numerous routers between the reflection server 16 and the attack victim 14, the path taken by any particular packet received by attack victim 14 differs from many of the other malicious packets sent to attack victim 14. This contrasts with an attack packet sent directly from attacker 12 to attack victim 14, which would most likely take the same path in every instance.

The result of the attack illustrated in FIGS. 1A and 1B is the effective cessation of legitimate traffic to victim 14 because the victim's ingress bandwidth is swamped. According to the teachings of the invention, attacks such as these or other types of attacks are addressed by assessing at the reflection servers, or routers, 16, whether a particular SYN packet received is likely a spoofed SYN packet with a phony source address. In general, this may be performed by storing for a reasonable amount of time previously received SYN packets along with identifying information for the SYN packet (such as its source address) and comparing the stored SYN packets to each subsequently received SYN packet. If it is determined from the comparison that a currently received SYN packet matches a stored packet, then a currently received SYN packet may be a spoofed packet, which is then discarded. Additional details of example implementations of the invention are described below with reference to FIGS. 2 through 6.

Figure 2:
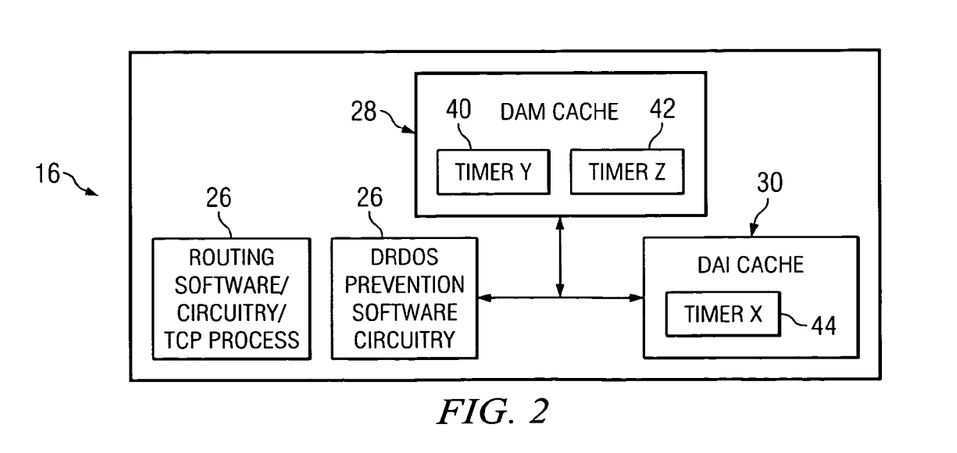
FIG. 2 is a block diagram illustrating details of one embodiment of a reflection server according to the teachings of the invention.

FIG. 2 is a block diagram illustrating an example router 16 according to the teachings of the invention. Router 16 is operable to detect spoofed SYN packets that contain a source address of a potential victim 14. In this example, router 16 includes routing software/circuitry 24, which performs the standard operations of an internet router and/or TCP server, including TCP processes. In addition, router 16 includes a DRDOS prevention software/circuitry unit 26. Unit 26 is operable to detect spoofed SYN packets and prevent responding to such spoofed SYN packets with a SYN+ACK packet, as described in greater detail below. In one particular embodiment, router 16 also includes a DRDOS attack mitigating cache (DAM cache) 28 and a DRDOS attack identifying cache (DAI cache) 30. As described in greater detail below, in one embodiment, caches 28 and 30 may be used to appropriately select packets based upon the history of previously received packets that are likely to be spoofed SYN packets.

In this regard, in one embodiment, DAM cache 28 includes two timers: a timer Y 40 and a timer Z 42. As described in greater detail in conjunction with FIG. 6, timer Y is associated with a time in which the number of instances of particular tuples occurs in the DAM cache 28. If the number of instances exceeds a particular number within the time period specified by timer Y 40, then an attack is indicated. Timer Z 42 is a second timer associated with DAM cache 28 that is used to identify stale attacks. As described in greater detail in conjunction with FIG. 6, if timer Z 42 expires, this indicates that a previous attack is no longer a threat and the associated tuple is removed from DAM cache 28. This is useful to prevent memory overload in DAM cache 28, including intentional attacks on the memory capabilities of DAM cache 28. DAI cache 30 includes, in one embodiment, a timer X 44. Timer X 44 is a timer used in monitoring occurrences of tuples in DAI cache 30. In general, once timer X 44 expires all entries in DAI cache 30 are scanned and certain entries are merged and placed into DAM cache 28, as described in greater detail below. In one embodiment timer Y 40 is three times timer X 42 and timer Z 42 is fifty times timer X 42; however, other time periods may be used for these timers.

Although the above-described units 24, 26, 28, and 30 are referred to separately, it will be understood that various components of each may be formed integral with components of the other units. For example, DRDOS prevention software/circuitry 26 may be included within a single integrated unit with routing software/circuitry 24. Furthermore, it will be understood that the functions of routing software/circuitry 24 and DRDOS prevention software/circuitry 26 may be performed in software or in hardware, as is commonly performed in the art.

Figure 3A:
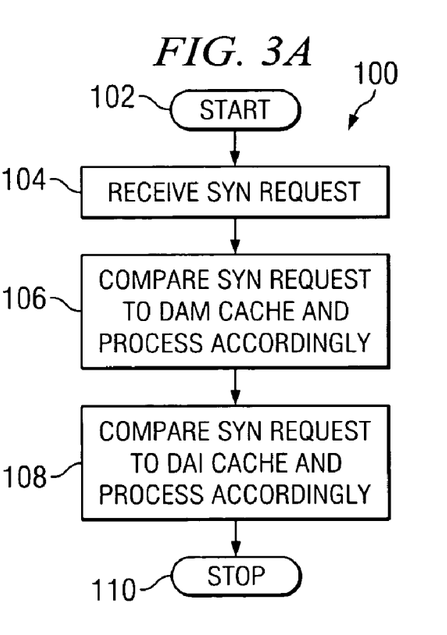
FIG. 3A through 3C are flowcharts illustrating parallel processes associated with a method for addressing the attack of FIG. 1 according to the teachings of the invention.

FIG. 3A is a flowchart illustrating operation of DRDOS prevention software/circuitry 26 in response to receiving a SYN request. The method 100 begins at step 102. At step 104 a SYN request, or SYN packet, is received by router 16. DRDOS prevention software/circuitry 26 examines this SYN packet and compares it to tuples stored in DAM cache 28 that are representative of previously received SYN packets. As described in greater detail below, tuples stored in DAM cache 28 represent packets that are likely spoofed packets for which a response is not desired. If the SYN request matches tuples stored in the DAM cache, then a SYN+ACK response is not sent, as described in greater detail below with respect to FIG. 4. By not responding with an ACK packet, the potential victim 14 is precluded from receiving spoofed SYN+ACK packets that would otherwise flood its bandwidth and prevent legitimate internet traffic from reaching victim 14. In particular embodiments, DRDOS prevention software/circuitry 26 is also operable to backtrack and determine the generating source of the spoofed SYN packet that resulted in the match. In a parallel process, DAM cache 28 is updated. Tuples are placed in DAM cache 28 due to repeated occurrences in DAI cache 30. Generating and updating DAM cache 28 is described in greater detail below in conjunction with FIGS. 3B and 6.

In addition to detecting spoofed SYN packets by comparing the packets to already stored suspect SYN packets, the method 100 includes compiling the SYN requests in DAI cache 30 and processing accordingly at step 108. This processing involves storing each SYN packet received for a particular period of time such that a determination can be made of whether the SYN packet likely constitutes a spoofed packet. Details associated with one implementation of step 108 are described in greater detail below in conjunction with FIG. 5. In a parallel process, DAI cache 30 is also updated, as described in greater detail in conjunction with FIGS. 3B and 6.

Thus, according to the teachings of the invention, incoming SYN packets are stored, or at least specific identifying information for each incoming SYN packet is stored, in a manner that allows comparison of incoming SYN packets to only those SYN packets that are determined to likely be spoofed packets. If a match is obtained between a currently received SYN packet and a stored tuple representing packets that are likely to be spoofed packets, the recently received SYN packet is dropped and no SYN+ACK packet is sent in response, thus mitigating attacks on victim 14.

Figure 3B:
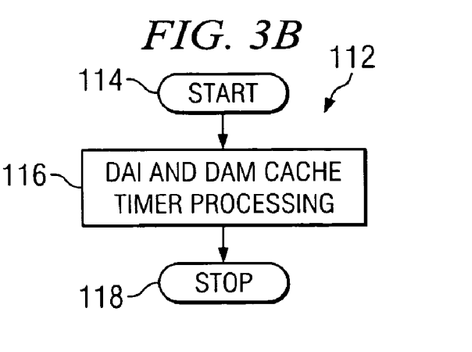

In a parallel process illustrated in FIG. 3B, a method 112, which begins at step 114 and concludes at step 118, monitors DAM cache 28 and DAI cache 30 with respect to timers X, Y, and Z (FIG. 2) and appropriately updates these codes 28 and 30. Example details of step 116 of processing the timers associated with DAM cache 28 and DAI cache 30 are described in conjunction with FIG. 6.

Figure 3C:
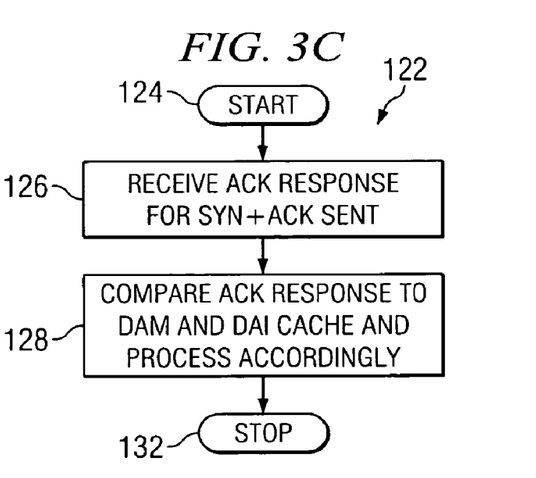

In a parallel process to methods 100 and 112, illustrated in FIG. 3C, a method 122 overrides these processes associated with identifying SYN requests as spoofed packets. In particular, at step 126 method 122 determines whether an ACK is received for a SYN+ACK sent in response to SYN request. In general, receipt of an ACK indicates the SYN that was responded to was not a spoofed packet. If so, the ACK is compared to tuples within DAM code 28 and DAI cache 30 and those caches are updated accordingly, as described in greater detail in conjunction with FIG. 7. Method 122 concludes at step 132.

Figure 4:
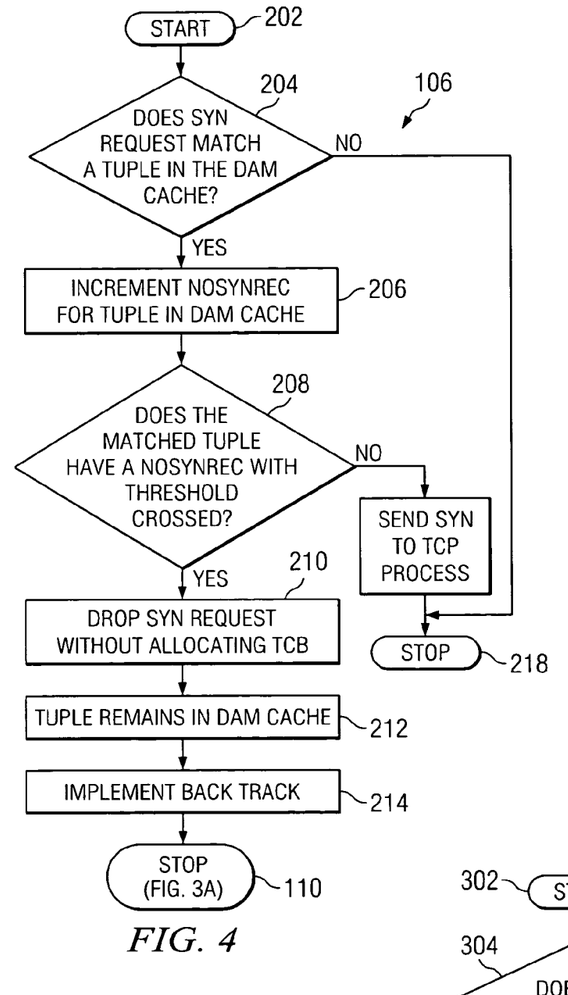
FIG. 4 is a flowchart illustrating example steps associated with a portion of the flowchart of FIG. 3A.
Figure 5:
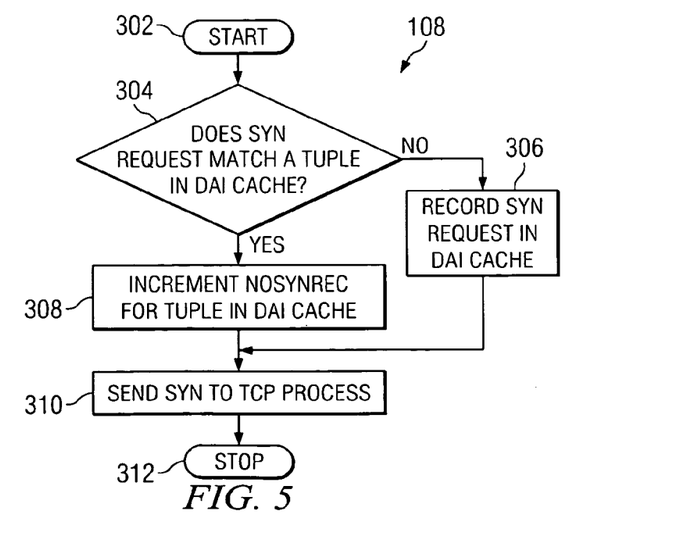
FIG. 5 is flowchart illustrating example steps associated with a second portion of the flowchart of FIG. 3A.

FIG. 4 is a flowchart illustrating steps associated with one embodiment of step 106 of FIG. 3A comparing a received SYN request to DAM cache 28 and processing that comparison accordingly. The method begins at step 202. At step 204 a determination is made of whether the SYN request matches a tuple in DAM cache 28. If there is no match, processing the SYN request proceeds as step 108 of FIG. 3A, as per FIG. 5, where the DAI cache 30 is updated/recorded with the information in the TCP SYN packet and the SYN packet is forwarded to the TCP process. Details of the process in FIG. 5 are provided in greater detail below. This represents normal operation of responding to a TCP SYN packet with a TCP SYN/ACK response. If however, the SYN request matches a tuple in DAM cache 28 this indicates the potential that the received SYN request is a spoofed SYN request.

Processing continues at step 206 in which a counter associated with a tuple in DAM cache 28 is incremented. The counter, referred to in this example as NOSYNREC, represents the number of times a SYN request was received corresponding to a particular tuple. As described in greater detail below, tuples are generated for SYN requests that represent received SYN requests. In one embodiment, each tuple contains the following pieces of information: SRC, DST, SRC port, DST port, and NOSYNREC. SRC refers to the source from which the SYN was received. DST refers to the specific interface/loopback address for which the SYN was received. SRC port refers to the source port in the SYN received. DST port refers to the destination port for which the SYN was received. NOSYNREC refers to the count of how many SYNs were received for the tuple. Also, to save memory certain ones of these parameters are represented as wildcards, since the actual value is irrelevant to a determination of whether the presented SYN packet is a spoofed packet.

At step 208, a determination is made of whether the matched tuple has a count, or NOSYNREC, that has crossed a particular threshold. Thus, it is determined whether SYN packets corresponding to a particular tuple have been received a certain number of times. As described in greater detail below, the DAM cache is periodically checked and cleared of older tuples that have not crossed the particular threshold. Thus, this threshold actually represents the number of times a SYN request has been received that corresponds to a particular tuple within a given period of time. Step 208 determines whether the matched tuple has a NOSYNREC counter that exceeds a configured threshold, which in one embodiment is 50 and in another is 100. If the threshold has not been crossed, the method proceeds to step 209, which is normal TCP processing, after which the method concludes at 218.

However if the threshold has been crossed, indicating that the received SYN request is a suspected spoofed request, then the SYN request is dropped without even allocating a transmission control block (TCB) for the SYN request, and no SYN+ACK response is sent. From then on, for this tuple no further pending SYN+ACK responses will be sent. Processing continues at step 212 in which the tuple remains in DAM cache 28.

At step 214 backtrack may be implemented. Backtrack refers to tracing back through the plurality of routers through which the SYN request was received to determine the ultimate source of the spoofed SYN request. Particular examples of backtrack are described here. For each tuple in the DAM cache 28 that has a sufficiently large number of SYN requests received, router 16 sends a packet with the tuple information through the ingress interface through which the spoofed packet was received, to upstream routers, which in turn may not have the victim's IP address as the SRC already in their DAM cache 28. If they do, then this validates the fact that the attack has affected them as well. Thus this would enable a trace in the previous hops until a point is reached at the ingress point in the network cloud 10 from where the attacker is sending its packets. Thus the first router in the plurality of hops to have received a spoofed packet may be notified more quickly than relying on that specific router to determine the existence of the spoofing itself. Once the first router in the plurality of hops is notified, spoofed SYN packets can be automatically identified by comparison to the tuple information received from downstream routers with the traffic stream entering at the first router into the network.

It may be the case that multiple ingress points are being used by the attacker. If a router that is acting as a reflector has more than one previous hop, then the information can be conveyed to both. If however the reflector has information about which a previous specific hop sent the spoofed packets, then the tuple can be sent to that specific previous hop. Recording the source MAC addresses could be done in the tuple information in order to enable this. In the absence of such information, multiple paths through such reverse notification may be achieved. In addition, the ingress interface (which stands for Interface Descriptor Block may be noted to confirm the tuple is coming through a specific ingress interface. This IDB information can be stored in the tuple as well. This could be used to confirm that the interface through which the packet matching the tuple came in is indeed the interface through which reverse notification needs to be sent.

When backtracking reaches the ingress of the cloud at its edge, and if the tuple has been installed and the flow is seen in any of the ingress interfaces, possible localization of an attack can be raised as a trap to a management station. Processing then jumps to and concludes at step 110 at FIG. 3A, bypassing act 108.

FIG. 5 is a flowchart illustrating example acts associated with step 108 of FIG. 3A of updating DAI cache 30. The method begins at step 302. At step 304 a determination is made of whether the SYN request matches any tuples stored in DAI cache 30. If a match is found, the NOSYNREC counter of the associated tuple in the DAI cache is incremented at step 308. If no match is found in the DAI cache, at step 306, the received SYN request is recorded in the DAI cache 30. Processing continues at step 310 the normal TCP operation continues. The method concludes at step 312.

Processing continues at step 310 in which received TCP communications are monitored for ACK and RST packets for all tuples in the DAI cache. The DAI cache is updated accordingly in response to receiving such packets. In particular, if an ACK is received for a SYN+ACK that was previously sent, then the tuple matching the ACK is removed from the DAI cache 30. Receipt of the ACK indicates that the SYN+ACK response to a SYN request was appropriate and that the SYN request was not a spoofed SYN request. If an RST is received for a SYN+ACK packet that was sent, then the tuple matching the RST is retained in the DAI cache 30. The victim may conventionally send a RST packet if a connection does not exist for a received SYN+ACK packet.

Figure 6:
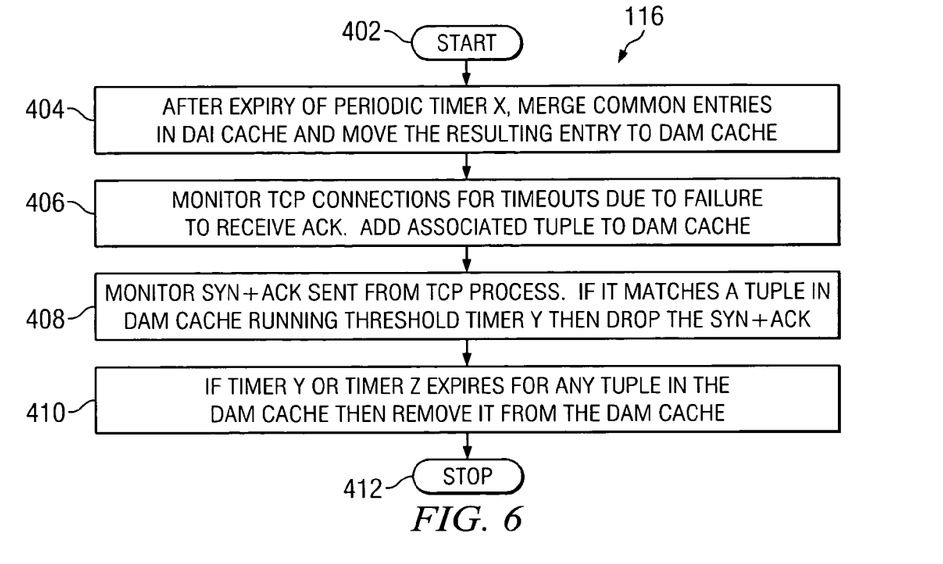
FIG. 6 is a flowchart illustrating example steps associated with a portion of the flowchart of FIG. 3B.

As mentioned above, step 116 of DAM cache 28 and DAI cache 30 processing (FIG. 3B) includes updating those caches based on the expiration of timers X, Y, and Z (times 44, 40, and 42, respectively). FIG. 6 illustrates example steps associated with one embodiment of such a method. The method begins at step 402. At step 404, after expiration of timer X 44, common entries in the DAI code 30 are merged and the resulting entries are moved into DAM cache 28. This merging may also occur when a maximum tuple entry limit (which can be a configured value) of DAI cache is reached. If there are multiple tuples with the same SRC and DST, with the same or different SRC port and DST port, then those entries will be merged into a single entry with the SRC port and DST port indicated as a wildcard. The NOSYNREC for the resultant entity will be the summation of the NOSYNREC in each individual tuple. The resultant merged entity will be shown as <SRC,DST,*,*,NOSYNREC>. If a cluster of hosts in a network is attacked, then the attack pattern will have a changing SRC IP address. In that case, the resultant tuple will be given as below. <SRC(A.B.C.*,DST,*,*,NOSYNREC>. The resultant entry tuple is then moved to the DAM cache 28, as described in greater detail below. All other entries that are unique will be flushed from the DAI cache 30 at the end of the particular time limit and the DAI cache timer, also called timer (X), is restarted.

The particular time limit at which the DAI cache 30 is examined and flushed may vary. Example values are described below. The above-described use of wildcards and the movement of suspected tuples from a DAI cache 30 to DAM cache 28 reduces memory requirements that may otherwise result from an excessively large number of tuples stored in memory. It also helps in mitigating attacks on the cache itself. In essence, DAI cache 30 is used for identified traffic that could constitute DRDOS attacks.

At step 406, incoming TCP connections are monitored for timeouts due to failure to receive ACK. Upon such a timeout, an entry is automatically moved by the TCP process to DAM cache 28. This addresses the special case where only one SYN packet arrives for every time period over which monitoring occurs.

At step 408, received TCP packets are monitored for ACK and RST packets for all tuples in DAM cache 28 and DAM cache 28 is updated accordingly. In particular, if an ACK is received for a SYN/ACK that was earlier sent then the tuple matching the ACK is removed from the DAM cache. In contrast, if an RST is received for a SYN/ACK that was sent earlier, then the tuple matching the RST is retained in the DAM cache 28.

At step 410, the time each tuple is retained in the DAM cache 28 is stored and if the time expires then the tuple is removed from the cache. In general, if the number of occurrences of SYN requests corresponding to a tuple in DAM cache 28 does not rise above a certain level within a certain time period, then the attack is not considered problematic enough to filter out corresponding SYN requests, or the tuple does not correspond to spoofed SYN packets. Thus, timers are maintained for each tuple in DAM cache 28 such that they are either retained or removed based upon the number of occurrences of SYN packets corresponding to the tuple received in the particular period of time. In one example, timer X 44 is set to 30 seconds and the number of occurrences that would cause the associated tuple to be moved to DAI cache 30 is 100. In that same example, timer Y 40 is 90 seconds and timer Z 42 is 1500 seconds. These timers can vary; however, the timer running for each tuple in DAM cache 28 (timer X 44) should be at least two or three times greater than the timer associated with DAI cache 30 (timer Y 40).

At step 410, tuples in DAM cache 28 with expired timers are removed. When DAM cache 28 reaches its maximum limit, any unique tuples in the cache will be flushed and if further memory reductions are required the oldest wildcard entry is removed from the cache. This addresses SYN flood attacks on the cache itself.

Figure 7:
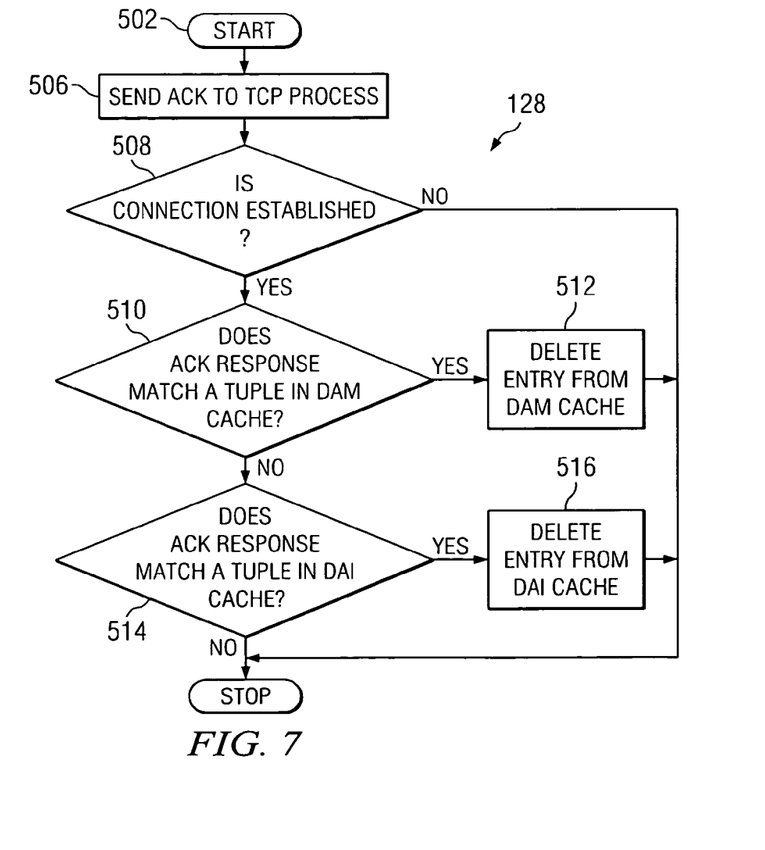
FIG. 7 is a flowchart illustrating example steps associated with a portion of the flowchart of FIG. 3C.

FIG. 7 is a flow chart illustrating example steps associated with process 122 (FIG. 3C) for overriding the tuple examination process when an ACK is received matching a tuple in DAM cache 28 or DAI cache 30. As described above, receipt of an ACK associated with a stored tuple indicates the associated received SYN was not a spoofed packet, and as such, the tuple should be removed from DAM cache and DAI cache 30. At step 506 the received ACK is processed first by the normal TCP process (by unit 24 of FIG. 2). If a connection is established at step 508, then processing continues at step 510. If not, the method concludes at step 518. At step 510 a determination is made of whether the ACK response matches a tuple in DAM cache 28. If so, the tuple is deleted from DAM cache 28 and the method concludes at step 518. If not, processing continues at step 514 where it is determined whether the ACK response matches a tuple in DAI cache 30. If so, the tuple entry is deleted from the DAI cache at step 516. Processing concludes at step 518.

A statistical analysis of one implementation of the above-described method and system is given in the following examples.

When a source wants to establish a TCP connection with a destination, the default behavior is that it sends four SYN's over a period of 60 sec. After receiving the SYN, the destination sends four SYN+ACK's over a period of 60 seconds For SYN sent by the transmitter:
t0—SYN sent
t0+2—SYN sent and starts a 4 sec timer
t0+6—SYN sent and starts a 8 sec timer
t0+14—SYN sent and starts a 16 sec timer
t0+30—SYN sent and starts a 32 sec timer
t0+62—Clear connection state For SYN+ACK sent by the receiver:
t0—SYN+ACK sent
t0+2—SYN+ACK sent and starts a 4 sec timer
t0+6—SYN+ACK sent and starts a 8 sec timer
t0+14—SYN+ACK sent and starts a 16 sec timer
t0+30—SYN+ACK sent and starts a 32 sec timer
t0+62—Clear connection state For an attack traffic over a period of 60 sec, i.e., if 100 SYN's with the same source address but different source ports are received every 10 sec for a period of 60 sec, then the default TCP behavior will be— for each SYN, 4 SYN+ACK will be sent, each SYN+ACK being sent when the timer expires.
for 100 SYN's in 10 sec, 400 SYN+ACK will be sent.
for 300 SYN's in 30 sec, 1200 SYN+ACK will be sent.
for 600 SYN's in 60 sec, 2400 SYN+ACK will be sent.

With the algorithm according to the invention with timer X 44 set to 10 sec and timer Y 40 set to 30 sec and nosynrec threshold configured as 100, then the new TCP behavior will be— for 100 SYN's in 10 sec, approximately 200 SYN+ACK will be sent in first 10 sec at the end of which probable attack entries will be moved to DAM cache from the DAI cache, where further SYN+ACK gets throttled for 30 sec.

for 300 SYN's in 30 sec, approximately 200 SYN+ACK will be sent.

for 600 SYN's in 60 sec, approximately 400 SYN+ACK will be sent.

Timer y can be set higher to 60 or 75 sec to achieve further throttling of the SYN+ACK sent however this would delay a legitimate connection from the victim by the same amount of time.

With newer IOS images—

When a source wants to establish a TCP connection with a destination, the default behavior is that it sends three SYN's over a period of 30 sec. After receiving the SYN, the destination sends three SYN+ACK's over a period of 30 seconds.

For SYN sent by the transmitter:

t0—SYN sent
t0+2—SYN sent and starts a 4 sec timer
t0+6—SYN sent and starts a 8 sec timer
t0+14—SYN sent and starts a 16 sec timer
t0+30—Clear connection state For SYN+ACK sent by the receiver:

t0—SYN+ACK sent
t0+2—SYN+ACK sent and starts a 4 sec timer
t0+6—SYN+ACK sent and starts a 8 sec timer
t0+14—SYN+ACK sent and starts a 16 sec timer
t0+30—Clear connection state For an attack traffic over a period of 60 sec, i.e., if 100 SYN's with the same source address but different source ports are received every 10 sec for a period of 60 sec, then the default TCP behavior will be— for each SYN, 3 SYN+ACK will be sent, each SYN+ACK being sent when the timer expires.

for 100 SYN's in 10 sec, 300 SYN+ACK will be sent.
for 300 SYN's in 30 sec, 900 SYN+ACK will be sent.
for 600 SYN's in 60 sec, 1800 SYN+ACK will be sent.

With the cache algorithm according to the invention with timer x set to 15 sec and timer y set to 60 sec and nosynrec threshold configured as 100, then the new TCP behavior will be— for 150 SYN's in 15 sec, approximately 300 SYN+ACK will be sent in first 15 sec at the end of which probable attack entries will be moved to DAM cache from the DAI cache, where further SYN+ACK gets throttled for 60 sec.

for 300 SYN's in 30 sec, approximately 300 SYN+ACK will be sent.

for 600 SYN's in 60 sec, approximately 300 SYN+ACK will be sent.

In one embodiment, the timer X 44 can have a range from 5 to 20 seconds and timer Y 40 can have a range from 30 to 90 seconds. This is based on the fact that applications such as BGP or LDP, periodically retry to establish session between the routers and hosts trying to establishing TCP connection typically retry three times in a period of 120 sec (30 sec for each try) before declaring that the connection cannot be established. Hence, longer the timer y, the delay in establishing the TCP connection by the source (victim) to that destination will be in the range of y and y+15 seconds, when it is experiencing a DRDOS attack.

Although the present invention and its advantages have been described in detail, it should be understood that various changes, substitutions, and alterations can be made therein without departing from the spirit and scope of the invention as defined by the appended claims.

What is claimed is:

1. A method for addressing attacks on a computer connected to a network comprising:

receiving at a router a TCP SYN request to be screened;

comparing the received TCP SYN request to be screened to at least one stored tuple representative of one or more SYN requests previously received at the router and determining that the received TCP SYN request to be screened matches the stored tuple; and in response to the determination that the received TCP SYN request to be screened matches the stored tuple, incrementing a counter associated with the stored tuple; and in response to the counter reaching a threshold:

preventing the router from sending a TCP SYN+ACK response in response to the TCP SYN request to be screened;

dropping the TCP SYN request to be screened; and preventing the router from allocating a transmission control block (TCB) for the TCP SYN request to be screened.

2. The method of claim 1, wherein the stored tuple is representative of a plurality of SYN requests previously received at the router that have the same indicated source.

3. The method of claim 1, wherein the stored tuple is representative of a plurality of SYN requests previously received at the router that have the same indicated source and destination.

4. The method of claim 1, wherein the plurality of SYN requests comprises at least 100 SYN requests received by the router no more than 30 seconds before receiving the received TCP SYN request to be screened.

5. The method of claim 1, wherein the at least one tuple is stored in a first cache.

6. The method of claim 5, and further comprising moving the at least one tuple into the first cache from a second cache.

7. The method of claim 5, and further comprising moving the at least one tuple into the first cache from a second cache in response to determining that a plurality of TCP SYN requests matching the at least one tuple have been received by the router within a period of 10 seconds.

8. The method of claim 5, and further comprising moving the at least one tuple into the first cache from a second cache in response to detetinining that a plurality of TCP SYN requests matching the at least one tuple have been received by the router and retained in the second cache.

9. The method of claim 6, and further comprising setting a threshold timer when the number of SYN requests matching the at least one tuple stored in the first cache exceeds a particular number within a particular timeframe.

10. The method of claim 9, wherein the act of preventing response to the TCP SYN request to be screened comprises preventing the TCP SYN request to be screened only if the threshold timer is set and has not expired.

11. The method of claim 1, and further comprising storing the source MAC address for the received TCP SYN request to be screened in identifying the source of the received TCP SYN request to be screened.

12. A system for addressing attacks on a computer connected to a network comprising:

a non-transitory computer-readable medium;

a first cache; and a computer program stored in the non-transitory computer readable medium operable to:

receive a TCP SYN request to be screened;

compare the received TCP SYN request to be screened to at least one tuple stored in the first cache that is representative of one or more SYN requests previously received at the system and determine that the received TCP SYN request to be screened matches the stored tuple; and in response to the determination that the received TCP SYN request matches the stored tuple, increment a counter associated with the stored tuple; and in response to the counter reaching a threshold:
prevent the system from sending a TCP SYN+ACK response in response to the TCP SYN request to be screened;
drop the TCP SYN request to be screened; and
prevent the system from allocating a transmission control block (TCB) for the TCP SYN request to be screened.

13. The system of claim 12, wherein the tuple is representative of a plurality of SYN requests previously received at the system that have the same indicated source.

14. The system of claim 12, wherein the stored tuple is representative of a plurality of SYN requests previously received at the router that have the same indicated source and destination.

15. The system of claim 12, wherein the plurality of SYN requests comprise at least 100 SYN requests received by the router no more than 30 seconds before receiving the received TCP SYN request to be screened.

16. The system of claim 12, and further comprising a second cache and wherein the computer program is further operable to move the at least one tuple into the first cache from the second cache.

17. The system of claim 12, and further comprising a second cache and wherein the computer program is further operable to move the at least one tuple into the first cache from the second cache in response to determining that a plurality of TCP SYN requests matching the at least one tuple have been received by the system within a period of 10 seconds.

18. The system of Clam 12, and further comprising a second cache and wherein the computer program is operable to move the at least one tuple into the first cache from a second cache in response to determining that a plurality of TCP SYN requests matching the at least one tuple have been received by the system and retained in the second cache.

19. The system of claim 16, wherein the computer program is further operable to set a threshold timer when the number of SYN requests matching the at least one tuple stored in the first cache exceeds a particular number within a particular timeframe.

20. The system of claim 19, wherein the computer program is operable to prevent response to the TCP SYN requests by preventing the TCP SYN request only if the threshold timer is set and has not expired.

21. The system of claim 12, wherein the computer program is further operable to store the source MAC address for the received TCP SYN request to be screened and identify the source of the received TCP SYN request to be screened.

22. Logic encoded in a non-transitory computer readable medium configured, when executed, to:
receive a TCP SYN request to be screened;
compare the received TCP SYN request to be screened to at least one stored tuple representative of one or more SYN requests previously received and determine that the received TCP SYN request to be screened matches the stored tuple; and
in response to the determination that the received TCP SYN request matches the stored tuple, increment a counter associated with the stored tuple; and
in response to the counter reaching a threshold:
prevent sending a TCP SYN+ACK response in response to the TCP SYN request to be screened;
drop the TCP SYN request to be screened; and
prevent allocating a transmission control block (TCB) for the TCP SYN request to be screened.

23. The logic of claim 22, wherein the stored tuple is representative of a plurality of SYN requests previously received that have the same indicated source.

24. The logic of claim 22, wherein the stored tuple is representative of a plurality of SYN requests previously received that have the same indicated source and destination.

25. The logic of claim 22, wherein the plurality of SYN requests comprise at least 100 SYN requests received no more than 30 seconds before receiving the received TCP SYN request to be screened.

26. The logic of claim 22, the at least one tuple is stored in a first cache.

27. The logic of claim 26, wherein the logic is further configured to move the at least one tuple into the first cache from a second cache.

28. The logic of claim 26, wherein the logic is further configured to move the at least one tuple into the first cache from a second cache in response to determining a plurality of TCP SYN requests matching the at least one tuple have been received by within a period of 10 seconds.

29. The logic of claim 26, and further comprising moving the at least one tuple into the first cache from a second cache in response to determining that a plurality of TCP SYN requests matching the at least one tuple have been received and retained in the second cache.

30. The logic of claim 27, and further comprising setting a threshold timer when the number of SYN requests matching the at least one tuple stored in the first cache exceeds a particular number within a particular timeframe.

31. The logic of claim 30, wherein the logic is further configured to prevent response to the TCP SYN request by preventing the TCP SYN request only if the threshold timer is set and has not expired.

32. The logic of claim 22, wherein the logic is further configured to store the source MAC address for the received TCP SYN request to be screened and identify the source of the received TCP SYN request to be screened.

33. A router comprising:
a routing unit configured to receive and transmit packets;
a first cache; and
an attack mitigator configured to:
receive a TCP SYN request to be screened;
compare the received TCP SYN request to be screened to at least one tuple stored in the first cache that is representative of one or more SYN requests previously received at the router and determine that the received TCP SYN request to be screened matches the stored tuple; and
in response to the determination that the received TCP SYN request matches the stored tuple, increment a counter associated with the stored tuple; and
in response to the counter reaching a threshold:
prevent the router from sending a TCP SYN+ACK response in response to the TCP SYN request to be screened;
drop the TCP SYN request to be screened; and
prevent the router from allocating a transmission control block (TCB) for the TCP SYN request to be screened.

34. The router of claim 33, wherein the tuple is representative of a plurality of SYN requests previously received at the router that have the same indicated source.

35. The router of claim 33, wherein the stored tuple is representative of a plurality of SYN requests previously received at the router that have the same indicated source and destination.

36. The router of claim 33, wherein the plurality of SYN requests comprise at least 100 SYN requests received by the router no more than 30 seconds before receiving the received TCP SYN request to be screened.

37. The router of claim 33, and further comprising a second cache and wherein an attack mitigator is further configured to move the at least one tuple into the first cache from the second cache.

38. The router of claim 33, and further comprising a second cache and wherein an attack mitigator is further configured to move the at least one tuple into the first cache from the second cache in response to determining that a plurality of TCP SYN requests matching the at least one tuple have been received by the system within a period of 10 seconds.

39. The router of Clam 33, and further comprising a second cache and wherein an attack mitigator is configured to move the at least one tuple into the first cache from a second cache in response to determining that a plurality of TCP SYN requests matching the at least one tuple have been received by the system and retained in the second cache.

40. The router of claim 33, wherein an attack mitigator is further configured to set a threshold timer when the number of SYN requests matching the at least one tuple stored in the first cache exceeds a particular number within a particular timeframe.

41. The router of claim 33, wherein an attack mitigator is configured to prevent response to the TCP SYN requests by preventing the TCP SYN+ACK response only if the threshold timer is set and has not expired.

42. A system for addressing attacks on a computer connected to a network comprising:
  means for receiving at a router a TCP SYN request to be screened;
  means for comparing the received TCP SYN request to be screened to at least one stored tuple representative of one or more SYN requests previously received at the router and for determining that the received TCP SYN request to be screened matches the stored tuple; and
  means for incrementing a counter associated with the stored tuple; and
  in response to the counter reaching a threshold:
    means for preventing the router from sending a TCP SYN+ACK response in response to the TCP SYN request to be screened;
    means for dropping the TCP SYN request to be screened; and
    means for preventing the router from allocating a transmission control block (TCB) for the TCP SYN request to be screened.

* * * * *